G. T. BOND.
BENDING MACHINE.
APPLICATION FILED OCT. 4, 1916.
1,240,534.
Patented Sept. 18, 1917.
6 SHEETS—SHEET 4.
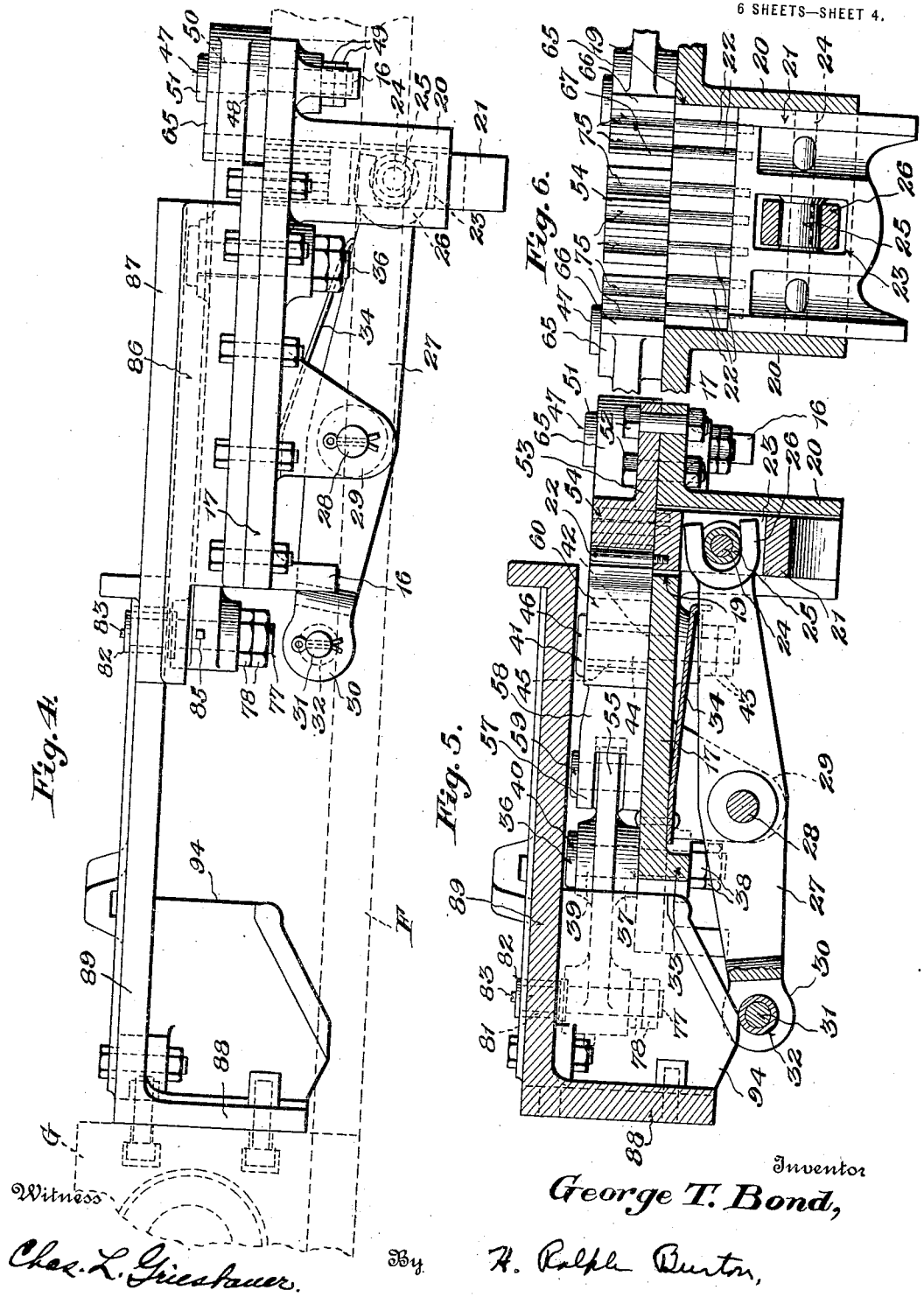
Witness
Chas. L. Grieshauer.
Inventor
George T. Bond,
By H. Ralph Burton,
Attorney

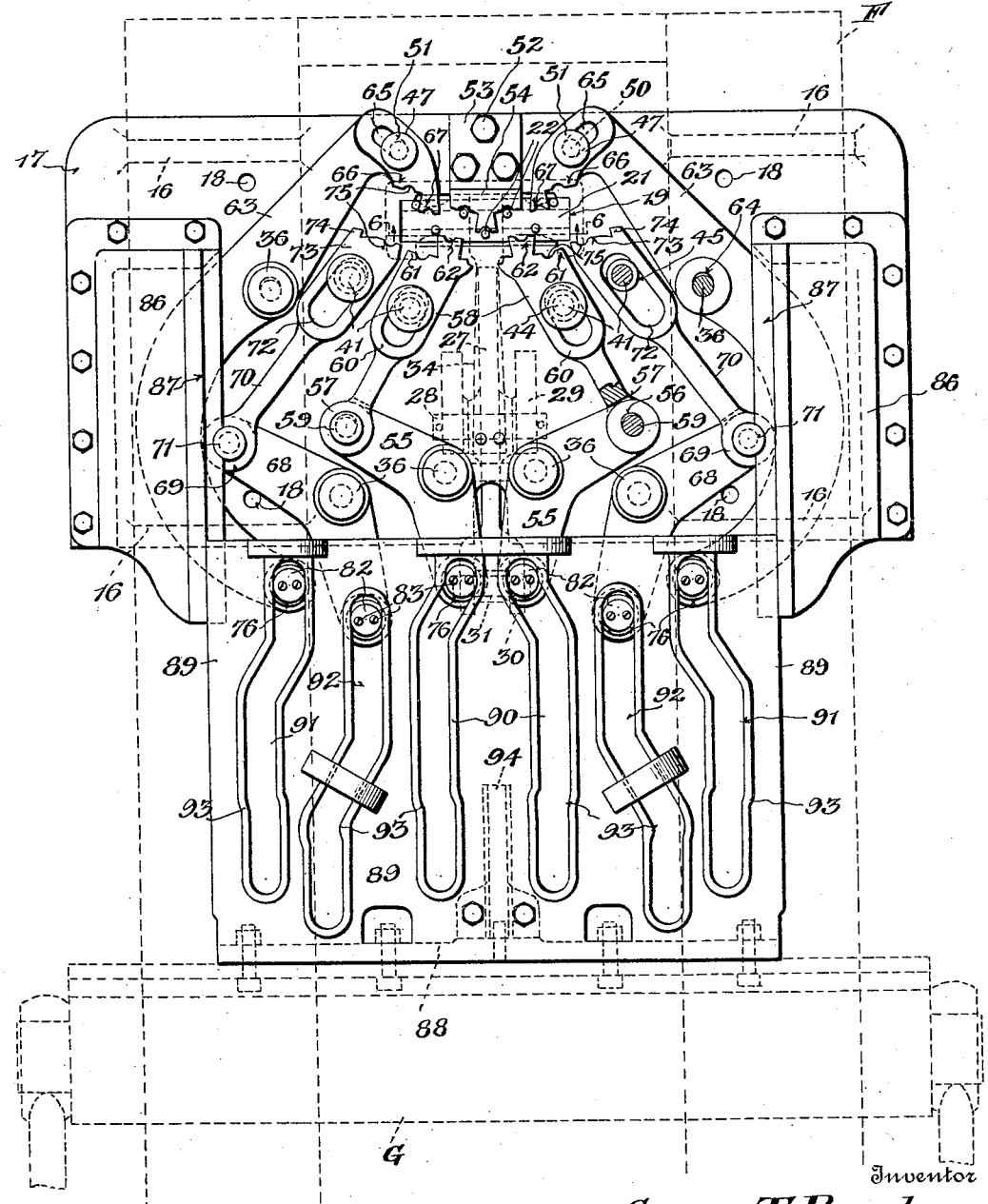

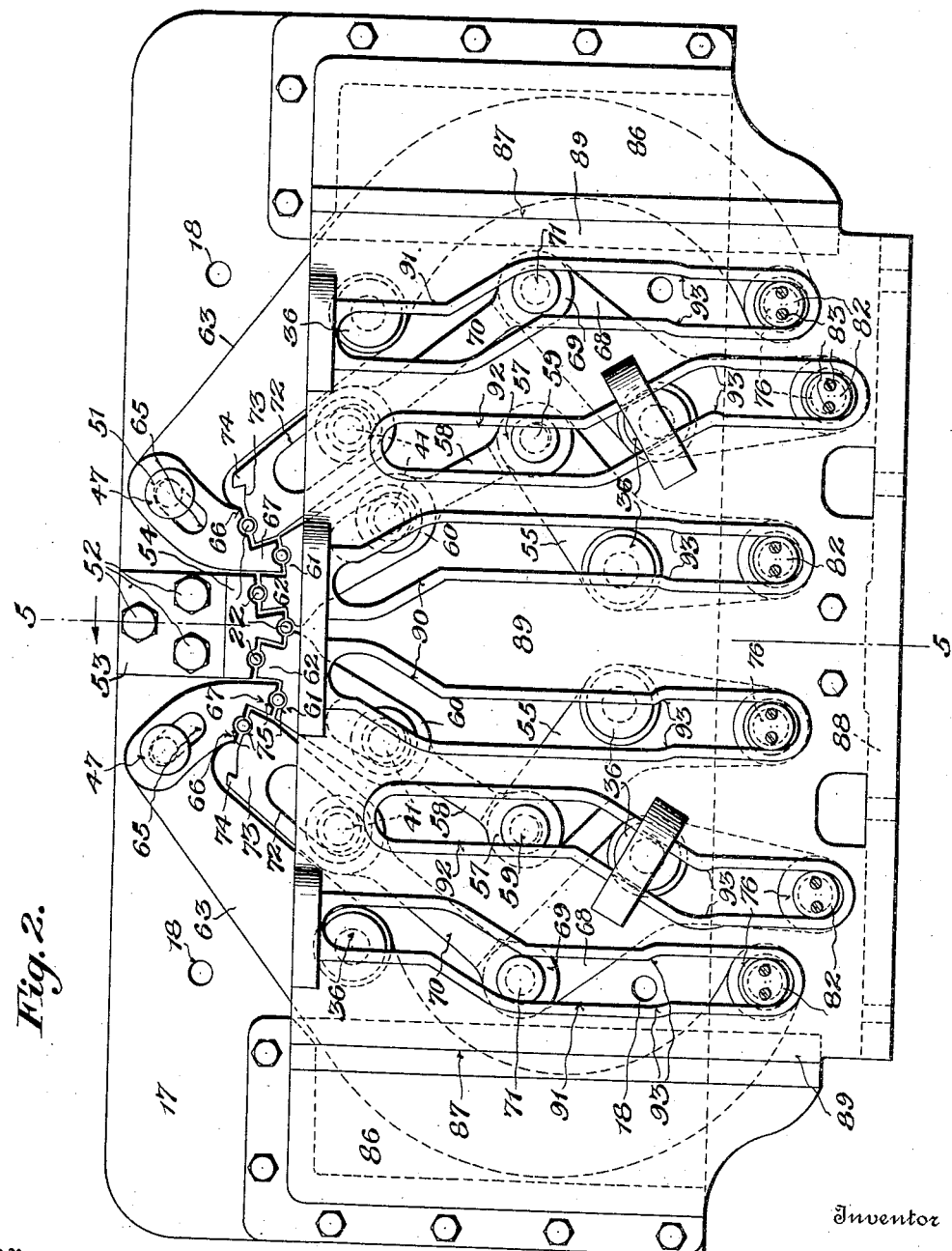

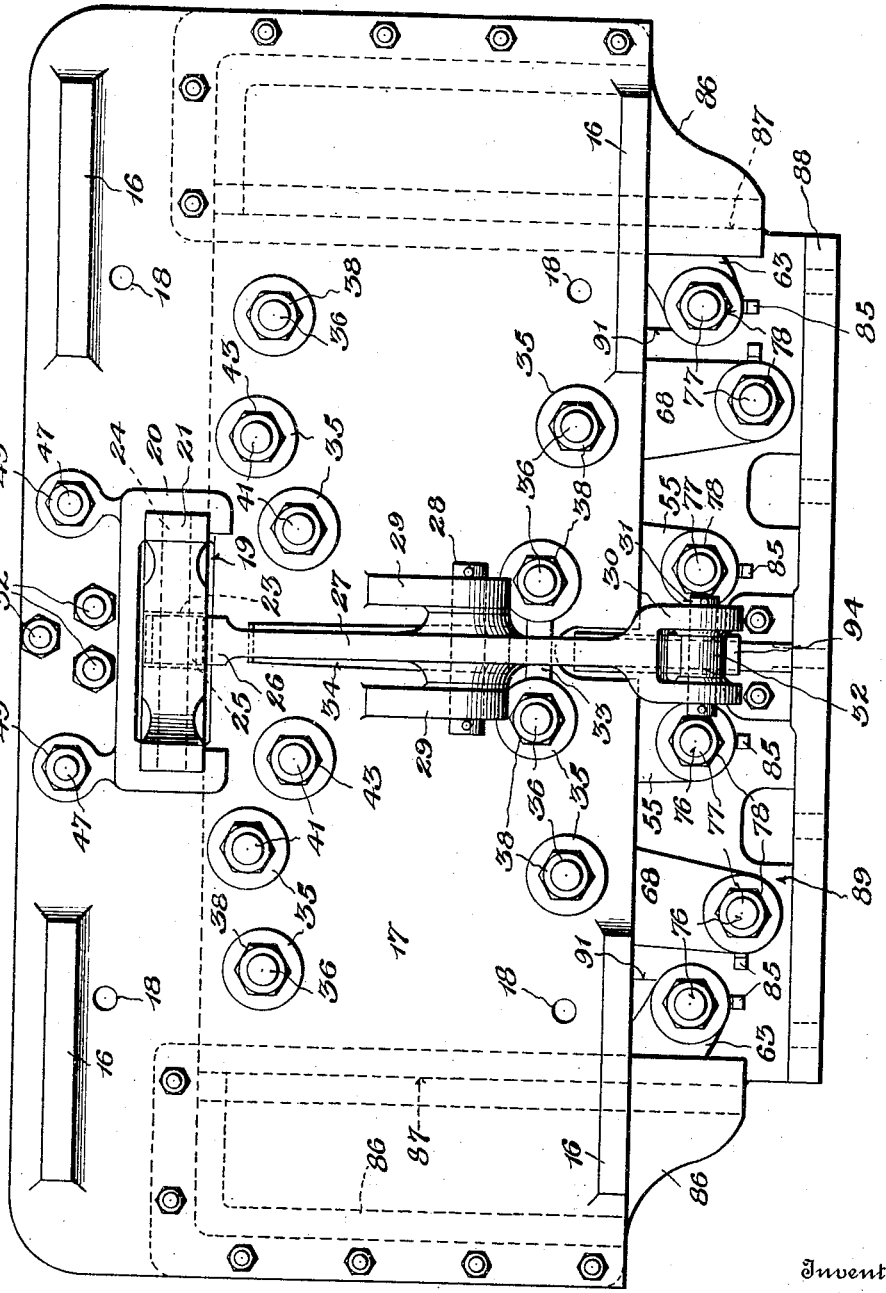

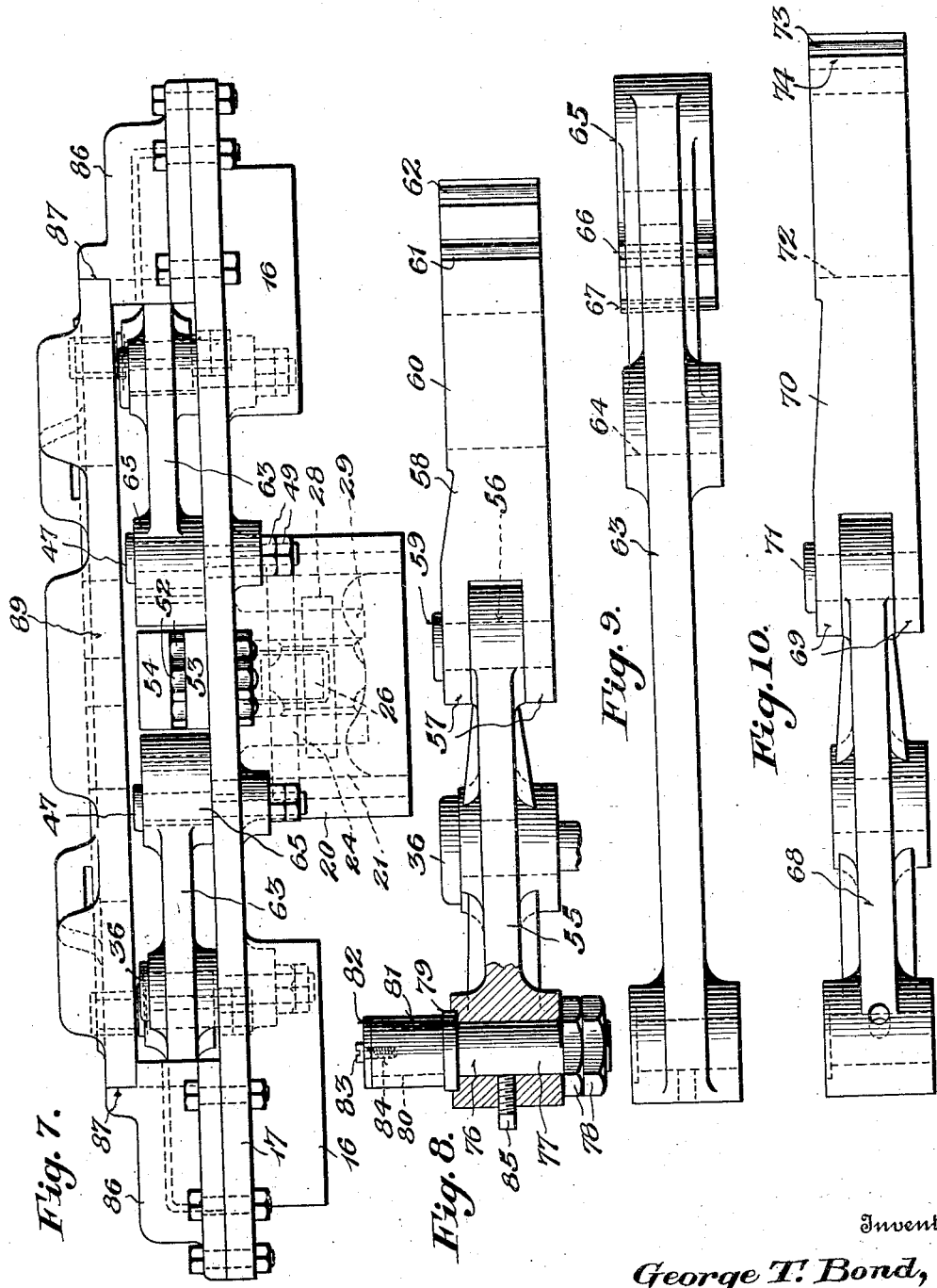

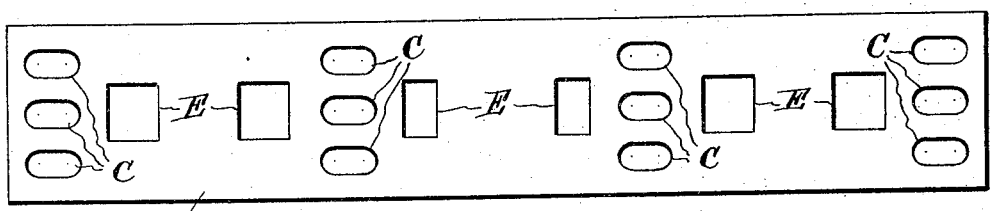
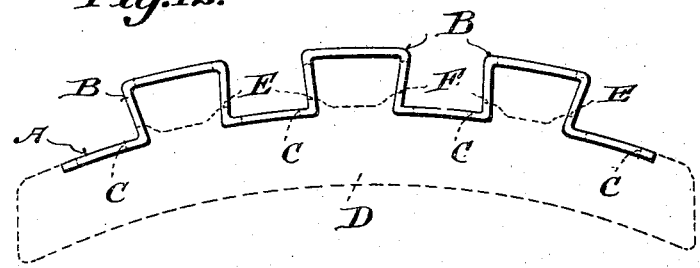
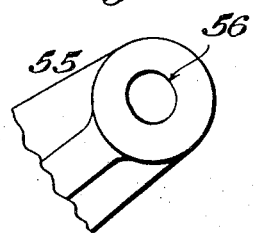
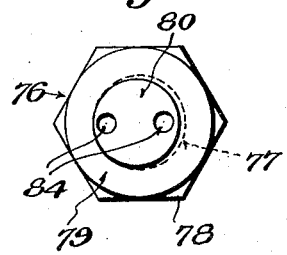
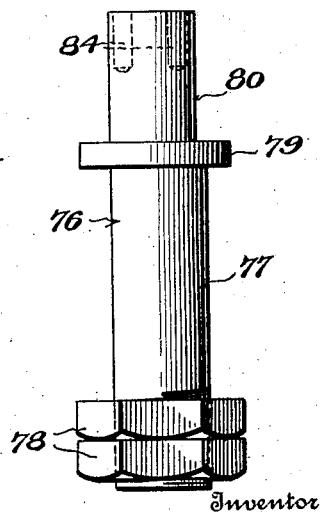
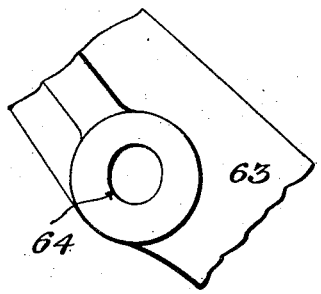

UNITED STATES PATENT OFFICE.

GEORGE T. BOND, OF HUNTINGTON, WEST VIRGINIA.

BENDING-MACHINE.

1,240,534. Specification of Letters Patent. Patented Sept. 18, 1917.

Application filed October 4, 1916. Serial No. 123,698.

*To all whom it may concern:*

Be it known that I, GEORGE T. BOND, a citizen of the United States, residing at Huntington, in the county of Cabell and State of West Virginia, have invented certain new and useful Improvements in Bending-Machines, of which the following is a specification, reference being had therein to the accompanying drawings.

This invention relates particularly to the bending of flat metal stock to form a plurality of extensions from what was the plane surface of the stock, and it is an object of the invention to provide a machine that is capable in one operation of its actuating member of forming successively in a rapid, efficient, and economical manner the plurality of bends required for the purpose for which the product is intended.

The machine disclosed herein as one embodiment of the invention is adapted for use in the manufacture of steel backs for brake-shoes, and particularly in the production of backs of the type that have lugs of dovetail shape for attachment of the shoes to brake-heads. The machine successfully overcomes the difficulties encountered in the use for this purpose of machines heretofore employed for metal bending, and it avoids the necessity of performing more than one operation of the actuating member in the bending of a single back.

Among the other advantages possessed by a machine constructed in accordance with this invention is that the successively moving parts acting on the material make the bends in sequence and thus do not have a tendency to stretch and tear the metal, as is the case where all bends are attempted to be made simultaneously.

When read in connection with the description herein, the details of construction and arrangement of parts contemplated by the invention will be apparent from the accompanying drawings, forming part hereof, wherein there is disclosed, for purposes of illustration, an embodiment of the invention adapted to the formation of brake-shoe backs having dovetail-shaped lugs, and arranged to be connected with and operated by a type of bending-machine known as a "bull dozer" in general use in car-manufacturing plants, the characteristics of such a machine being so well known in the art that it is necessary only to show the parts thereof to which the machine of this invention is connected to disclose a manner in which the machine may be mounted and power may be applied in its operation.

While the disclosures herein now are considered to exemplify a preferable embodiment of the invention, it is to be understood that it is not the intention to be limited necessarily thereto in interpretation of the claims, as alterations and modifications within the limits of the claims can be made and the invention adapted to the manufacture of other products and to other purposes and to use in association with other machines than those described without departing from the nature and spirit of the invention.

Like reference-characters refer to corresponding parts in the views of the drawings, of which—

Figure 1 is a top view, the cam-plate being in withdrawn position;

Fig. 2 is a top view, the cam-plate being in forward position;

Fig. 3 is a bottom view;

Fig. 4 is a side elevation, the cam-plate being in withdrawn position;

Fig. 5 is a sectional view on the line 5—5, Fig. 2, the cam-plate being in forward position;

Fig. 6 is a view of the ejector and its guide on the line 6—6, Fig. 1, the movable formers being in withdrawn position;

Fig. 7 is a front elevation;

Fig. 8 is a side view of one of the primary formers and its actuating-lever, partly in section;

Fig. 9 is a side view of one of the secondary former-levers;

Fig. 10 is a side view of one of the tertiary formers and its actuating-lever;

Fig. 11 is a plan view of a piece of brake-shoe-back stock before bending;

Fig. 12 is a side view thereof after bending;

Fig. 13 is a fragmentary plan view of one of the primary former-levers;

Fig. 14 is a top view of one of the cam-follower bolts;

Fig. 15 is a view in elevation of one of the cam-follower bolts; and

Fig. 16 is a fragmentary top view of one of the secondary former-levers.

The embodiment of the invention disclosed herein is designed particularly for the formation, from a piece of punched sheet-metal stock A, of a brake-shoe back having lugs B of dovetail shape for attachment to a brake-head, as shown by Figs. 11 and 12 wherein C designates openings to take metal when a shoe D is cast to the back to insure a permanent association of the parts, and E designates openings that constitute ways in the lugs for a securing-key.

The machine is adapted to be supported by a base part F of a "bull dozer" bender or other apparatus in association with which it is used, and to be actuated by a moving part G of such an apparatus.

Legs 16 cast integrally of and depending from a base-plate 17 of the machine support the plate on the base part F or other suitable foundation, and the plate is held firmly thereon in fixed position by any suitable securing means disposed in holes 18.

Near the front of the plate 17 there is a substantially rectangular opening 19 therethrough. An ejector-guide 20 is cast integrally of and depends from the plate, and it is machined inside to receive and guide an ejector 21 directly beneath and into the opening 19. The ejector has firmly fixed therein and upstanding from its top a plurality of ejector-pins or push members 22, which are movable upwardly through the opening 19 and are disposed to contact at their ends and to push upwardly and thereby to release the backs after they are formed successively, as hereinafter more particularly described. The ejector is formed with a central opening 23, across which extends a horizontally-disposed pin 24 having journaled thereon an anti-friction sleeve 25, which is straddled by the members of a forked end 26 of an ejector-lever 27 fulcrumed on a pin 28 carried by lugs 29 cast integrally of and depending from the base-plate 17. The other end 30 of the lever is forked, and the members thereof carry a horizontally-disposed pin 31 having journaled thereon between the members an anti-friction sleeve 32. A stop 33 depends from plate 17 and is positioned above the free end portion of the lever 27 in such position that the lever will contact therewith and thus prevent the ejector from descending below the point required for the ejector-pins to clear the top surface of the plate. A spring 34 fast to the bottom of the plate bears against the portion of the lever 27 between its fulcrum and the ejector, and it has a tendency to move that portion of the lever and thus the ejector downwardly. Ordinarily the weight of the ejector itself is sufficient to cause its downward movement at the proper times, but the spring is interposed between the plate and lever to make the movement more positive and to overcome any tendency of the ejector to bind in its slide in case it is clogged by foreign matter.

The plate is formed with a plurality of holes surrounded by reinforcing-bosses 35 on the under face uniformly arranged on each side of the median line extending from the front to the rear of the plate, so that for every hole there is a correspondingly-positioned hole on the other side of the median line. In some of these holes there are on each side of the median line three fulcrum-bolts 36, each of which is held to the plate by a shoulder 37 bearing against the top face and by nuts 38 bearing against the under face. Each of the bolts has a journal portion 39 extending above the plate, which terminates in a head 40. In other of the holes of the plate there are on each side of the median line two slide guide-bolts 41, each held to the plate by a shoulder 42 bearing against the top face and by nuts 43 bearing against the under face. Each of the bolts 41 has a journal portion 44 extending above the plate on which is an anti-friction sleeve 45 held in place by a head 46. In the remaining hole on each side of the median line there is a radial guide-bolt 47, which is held to the plate by a shoulder 48 bearing against the top face and by nuts 49 bearing against the under face, and which has a journal portion 50 extending above the plate and terminating in a head 51.

By bolts 52 extending through the plate a fixed former 53 is secured to the plate and slightly overlaps the opening 19 thereof. The face of the former is curved to correspond to the arcuate contour of the brake-shoe back when formed, and it has extending therefrom a centrally-disposed tool-steel die-head 54 of the shape of and positioned to have formed thereover the middle attaching-lug of the back. The fulcrum-bolts 36, slide guide-bolts 41, and radial guide-bolts 47 hold and guide movable parts that coöperate with the fixed former and with one another in the formation of the articles produced by the machine.

A bell-crank lever 55 is fulcrumed on each of the fulcrum-bolts 36 next to the median line of the plate 17, and in its end portion toward the front of the machine it has an opening 56 that is slightly elongated or oval on an axis transverse of the lever or in a direction substantially coincident with the line of strain imposed thereon, for a purpose hereinafter described. This end of the lever is connected pivotally to a bifurcated end 57 of a primary former 58 by a dead-pin 59 carried by the members of the bifurcated end, which straddle the lever, and disposed in the opening 56. The other end portion of the former 58 is enlarged and formed with a longitudinally-disposed slot 60, in which one of the guide-bolts 41 is disposed whereby the former is guided, and at the terminal of this portion there is a former-head 61, having a die-head 62 generally of dovetail form, and of a shape to press against the face and side of the die-head 54 and against the face of the former 53 and thereby to form the middle lug of the back.

A curved secondary lever 63 is fulcrumed on each of the fulcrum-bolts 36 farthest from the median line of the plate 17. This lever has intermediately of its ends an opening 64 that is slightly elongated or oval on an axis transverse of the lever or in a direction substantially coincident with the line of strain imposed thereon, in which opening the fulcrum-bolt is disposed. The front end portion of the lever is formed with a slot 65 that is arcuate on a radius centered substantially at the pivotal point of the lever, and in this slot there is disposed one of the radial guide-bolts 47, whereby that end of the lever is guided. From that end of the lever a secondary former-head 66 extends in a generally lateral direction, and its face and a die-head 67 extending therefrom of generally dovetail form are shaped to press the material against the face and die-head of the former-head 61 and thereby partially to form one of the end lugs of the back.

A bell-crank lever 68 is fulcrumed on each of the intermediate fulcrum-bolts 36, and at its front end it is apertured and straddled by the members of a forked end 69 of a tertiary former 70 and connected pivotally thereto by a dead-pin 71 carried by the forked members and disposed in the aperture. The other end portion of the former 70 is enlarged and formed with a longitudinally-disposed slot 72 in which one of the guide-bolts 41 is disposed whereby the former is guided, and at the terminal of this portion there is a former-head 73 of a shape to press the material against the face and die-head of the former-head 66 and thereby to complete the formation of one of the end lugs of the back and to press the end portion of the back to the general arcuate contour thereof. An abutment 74 extends from the face of each of the former-heads 73 for positioning the material to be bent and holding it against longitudinal displacement in proper relation to the fixed former until the first bending operation, the abutments being a distance apart equal to the length of the unbent material, which is placed between them. Of course, as soon as the middle lug is formed, the material is held in place by the die-head 54 over which the middle portion of the material has been bent in the formation of the middle lug.

It is to be understood that the designation of the parts 58, 63, and 70, respectively, as primary, secondary, and tertiary formers, and the corresponding designation of other parts immediately associated therewith, merely are for convenience in indicating their sequence of action, and not for the purpose indicating their relative importance.

The faces of the former-heads are formed with registering pairs of semi-circular vertical slots 75 arranged to receive the ejector-pins 22 as they are moved upwardly to remove the finished product after completion of the bending operation.

A cam-bolt 76 is positioned in the rear end of each of the bell-crank primary levers 55, the curved secondary levers 63, and the bell-crank tertiary levers 68. Each of these bolts includes a shank 77 disposed through a vertical opening in the end portion of the lever and held therein by nuts 78 on the lower end and a collar 79 against the top face of the lever. A journal portion 80 upstands above the collar, and it is eccentric to the shank portion for a purpose hereinafter described. An anti-friction sleeve 81 is held on the journal portion between the collar and a cap 82, and the cap is held on the upper end of the bolt by screws 83 in threaded holes 84. A set-screw 85 in the end portion of the lever engages the shank of the bolt and contributes to prevention of the bolt's turning in the lever. The parts 80 and 81 constitute cam-followers to swing the levers.

The former-heads are moved against and released from the material operated on, to bend the material and to discontinue pressure against the finished product, by any suitable member having cam-guideways uniformly arranged on each side of a median line, into which the cam-followers project, the cam-guideways being so formed and relatively arranged as to impart swinging movement to the pairs of levers in sequence at the proper times to effect the bending of the material and simultaneously to release the former-heads thereon after the bending is completed. The cam-guideways are machined so that the anti-friction sleeves 81 fit to a nicety therein. Adjustment is made so that the former-heads act exactly as required with respect to one another and to the fixed former by turning the cam-bolts 76, having the journal portions 80, which are eccentric to the shank portions in the levers.

The actuating member shown by the drawings and now described is an example of one that is adapted efficiently and satisfactorily to move the former-heads as required for production and discharge of the finished articles. Guide members 86 are bolted one on each end portion of the base-plate 17, they partially overhang those portions of the plate, and each has a guideway 87 on the end extending toward the other. A flange 88 depending from a cam-plate 89 is secured to the reciprocating part G of the "bull-dozer" or other apparatus, and the plate seats and is reciprocable in the guideways 87.

The plate 89 has a pair of cam-guideways 90, into which the cam-followers of the primary levers 55 extend; a pair of secondary cam-guideways 91, into which the cam-followers of the secondary levers 63 extend; and a pair of tertiary cam-guideways 92, into which the cam-followers of the tertiary levers 68 extend. The primary guideways 90 incline away from each other at their front portions for a distance requisite for the forming movement of the primary former-heads, and they thence continue in parallel relation to each other and to the line of movement of the plate, except as hereinafter described. The secondary guideways 91 extend in parallel relation to each other and to the line of movement of the plate from their front ends to a point that reaches the followers therein at or shortly after the time the parallel portions of the primary guideways have reached their followers, thence they incline away from each other for a distance requisite for the forming movement of the secondary former-heads, and thence they continue in the original relation, except as hereinafter described. The tertiary guideways 92 extend in parallel relation to each other and to the line of movement of the plate from their front ends to a point that reaches the followers therein at or shortly after the time the rear parallel portions of the secondary guideways have reached their followers, thence they incline away from each other for a distance requisite for the forming movement of the tertiary former-heads, and thence they continue in the original relation, except as hereinafter described.

As the cam-plate moves forwardly, the primary former-heads first are moved against the material, the material is bent to shape against the face and die-head of the fixed former 53, and the middle dovetail-shaped lug of the back is formed, and the primary former-heads thereafter are held against the material and restrained from backward movement by the parallel portions of the primary guideways 90. Then the secondary former-heads are moved forwardly and the material is forced and bent against the primary former-heads, a portion of each of the end lugs of the back is formed, and the secondary former-heads are held against the material and restrained from retraction by the rear parallel portions of the secondary guideways. Then the tertiary former-heads are moved forwardly and the material is bent against the secondary former-heads, the remainder of the end lugs is formed and the end portions of the back are pressed to the general arcuate contour thereof, and then the tertiary former-heads are held against the material by the rear parallel portions of the tertiary guideways.

By the time the forming movement of the tertiary former-head is completed, the back has been bent to the required form and it is ready for discharge. However, because of the dovetail shape of the lugs and of the die-heads of the primary and secondary former-heads, those heads cannot be withdrawn from the article, and for this reason the movement of the cam-plate cannot be reversed at this place and the inclined portions of its guideways brought to the followers and withdrawal movement imparted to the heads. Therefore, at places in the guideways adjacent to those that have reached the followers by the time the bending operation is completed, the guideways are offsetted or inclined for a short distance in a direction opposite to the inclined operating portions thereof, as shown at 93, and thence the guideways continue in their parallel relation to their rear ends. The cam-plate continuing to move, the followers on reaching the offsetted portions of the guideways cause a slight withdrawal movement of the tertiary formers and a release of pressure of the primary and secondary formers on the material, the slight movement of the primary and secondary levers 55 and 63 being permitted by the elongated or oval formation of the dead-pin holes 56 and fulcrum-bolt holes 64 thereof. The plate still continuing to move, the inclined edge of an ejector-cam 94 bolted to and depending from the rear portion of the plate engages the anti-friction sleeve 32 of the ejector-lever 27, the lever thereby is rocked, the ejector 21 is raised, the ejector-pins 22 thereof are moved into the slots 73, and the completed back thereby is pushed upwardly and discharged. Thereupon, the cam-plate is moved in the reverse direction, the former-heads thereby are brought to separated relation ready for reception therebetween of another blank to be bent to form, and the ejector returns to its lower or retracted position. The movements described are repeated successively as the cam-plate is reciprocated continuously, and a completed brake-shoe back is formed on every operation of the machine—that is, upon every reciprocation of the cam-plate.

Having thus described my invention, what I claim as new, and desire to secure by Letters Patent, is—

1. In a bending-machine, the combination of a base, a primary lever, a secondary lever, and a tertiary lever fulcrumed on said base, former-heads associated with said levers, a cam-follower on each of said levers, a member having cam-guideways in which said followers are disposed and arranged to impart sequential movement to said primary, secondary, and tertiary levers, and means for actuating said member.

2. In a bending-machine, the combination of a base, a fixed former secured to said base, a primary pair of levers, a secondary pair of levers, and a tertiary pair of levers fulcrumed on said base, former-heads associated with said levers, those with said primary levers being arranged to press material against said fixed former, those with said secondary levers to press material against said primary former-heads, and those with said tertiary levers to press material against said secondary former-heads, a cam-follower on each of said levers, a member having cam-guideways in which said followers are disposed and arranged to impart sequential movement to said primary, secondary, and tertiary levers, and means for actuating said member.

3. In a bending-machine, the combination of a fixed former, a primary former arranged to press material against said fixed former, a secondary former arranged to press material against said primary former, a tertiary former arranged to press material against said secondary former, a cam-follower associated with each of said primary, secondary, and tertiary formers, an actuating member having cam-guideways in which said followers are disposed and arranged to impart sequential bending action to said primary, secondary, and tertiary formers and to release pressing action thereof after bending of the material, an ejector positioned to engage the material, an ejector-actuator, and means whereby said ejector-actuator is moved after release of said formers and the material ejected from between them.

4. A bending-machine comprising a movable former-head, an actuating member therefor, a cam-follower associated with said actuating member, and an actuating member having a cam-guideway in which said follower is disposed, said guideway having a cam-surface arranged to impart bending action to said former-head and an offset arranged to release pressure from said former-head.

5. In a bending-machine, the combination of a movable former member, an actuating member therefor, one of said members having an opening elongated substantially in the direction of the strain imposed thereon and said other member having a connecting-pin disposed in said opening, a cam-follower on said actuating member, and another actuating member having a cam-guideway in which said follower is disposed, said guideway having a cam-surface arranged to impart bending action to said former member and an offset arranged to release pressure from said former member.

6. In a bending-machine, the combination of a movable former, a lever having an opening therein elongated substantially in the direction of the strain imposed thereon, a pin on said former disposed in said opening, a cam-follower on said lever, and an actuating member having a cam-guideway in which said follower is disposed, said guideway having a cam-surface arranged to impart bending action to said former and an offset arranged to release pressure from said former, 7. In a bending-machine, the combination of a fulcrum member, a lever having an elongated opening in which said fulcrum member is disposed whereby said lever is pivoted, a former associated with said lever, a cam-follower on said lever, and an actuating member having a cam-guideway in which said follower is disposed, said guideway having a cam-surface arranged to impart bending action to said former and an offset arranged to release pressure from said former.

8. In a bending-machine, the combination of a fixed former, a primary former arranged to press material against said fixed former, a secondary former arranged to press material against said primary former, a tertiary former arranged to press material against said secondary former, a cam-follower associated with each of said primary, secondary, and tertiary formers, and an actuating member having guideways in which said followers are disposed, said guideways being so relatively inclined and arranged that sequential bending action is imparted to said primary, secondary, and tertiary formers, and having offsets positioned to release pressure on said formers after completion of their bending movement.

9. In a bending-machine, the combination of a fixed former, a primary former arranged to press material against said fixed former, a secondary former arranged to press material against said primary former, a tertiary former arranged to press material against said secondary former, a cam-follower associated with each of said primary, secondary, and tertiary formers, an actuating member having guideways in which said followers are disposed, said guideways being so relatively inclined and arranged that sequential bending action is imparted to said primary, secondary, and tertiary formers and having offsets positioned to release pressure on said formers after completion of their bending movement, an ejector member movable with respect to said formers, push members on said ejector member arranged to be moved against material acted on by said formers, and means whereby ejecting movement is imparted to said ejector member after release of pressure on said formers.

10. In a bending-machine, the combination of a base, a fixed former secured thereto, a primary pair of levers, a secondary pair of levers, and a tertiary pair of levers fulcrumed on said base, former-heads associated with said levers and having registering slots in their abutting faces, those former-heads with the primary levers being arranged to press material against said fixed former, those with said secondary levers to press material against said primary former-heads, and those with said tertiary levers to press material against said secondary former-heads, a cam-follower on each of said levers, an actuating member having guideways in which said followers are disposed, said guideways being so relatively inclined and arranged that sequential bending action is imparted to said primary, secondary, and tertiary former-heads and having offsets positioned to release pressure on said former-heads after completion of their bending movement, an ejector member movable with respect to said former-heads, push members on said ejector member arranged to be moved into said former-head slots whereby to eject material bent between said heads, an ejector-actuator, and a cam on said actuating member whereby said ejector-actuator is moved after releasing movement of said followers.

11. In a bending-machine the combination of a base member, coöperating formers thereon having registering slots in their abutting faces, means whereby formers are actuated and pressure with respect to one another released, an ejector member movable with respect to said formers, push members on said ejector members arranged to be moved into said former-slots whereby to eject material bent between said formers, and means whereby ejecting movement is imparted to said ejector member after release of pressure of said formers.

12. In a bending-machine, the combination of a base member having an opening therein, coöperating formers thereon having registering slots in their abutting faces, means whereby formers are actuated and pressure with respect to one another released, an ejector member below said base member and movable into the opening thereof, push members upstanding from the top of said ejector member and arranged to be moved into said former-slots whereby to eject material bent between said formers, and means whereby ejecting movement is imparted to said ejector member after release of pressure of said formers.

13. In a bending-machine, the combination of a base member, coöperating formers thereon having registering slots in their abutting faces, an actuating cam-follower associated with some of said formers, an actuating member having cam-guideways in which said followers are disposed and shaped to impart bending and releasing movement to said followers, an ejector member movable with respect to said formers, push members on said ejector member arranged to be moved into said former-slots whereby to eject material bent between said formers, an ejector-actuator, and a cam on said actuating member positioned to move said ejector-actuator after releasing movement of said followers.

In witness whereof, I affix my signature.
GEORGE T. BOND.

Copies of this patent may be obtained for five cents each, by addressing the "Commissioner of Patents. Washington, D. C."